United States Patent [19]
Lee et al.

[11] Patent Number: 5,840,822
[45] Date of Patent: Nov. 24, 1998

[54] MONO(HYDROXYALKYL)UREA AND OXAZOLIDONE CROSSLINKING AGENTS

[75] Inventors: Sharon P. Lee, Edison; Steven P. Pauls, Sr., Old Bridge, both of N.J.

[73] Assignee: National Starch and Chemical Investment Holding Corporation, Wilmington, Del.

[21] Appl. No.: 922,244

[22] Filed: Sep. 2, 1997

[51] Int. Cl.$^6$ .......................... C08G 18/00; C08G 18/08; C08G 18/22
[52] U.S. Cl. .................. 528/44; 528/52; 528/75; 528/288; 528/306
[58] Field of Search ................. 528/44, 52, 75, 528/288, 306

[56] References Cited

U.S. PATENT DOCUMENTS

| | | | |
|---|---|---|---|
| 3,635,835 | 1/1972 | Peterson | 252/315 |
| 3,965,072 | 6/1976 | Markiewitz . | |
| 4,076,917 | 2/1978 | Swift et al. | 526/49 |
| 4,101,606 | 7/1978 | Cenci et al. . | |
| 4,115,637 | 9/1978 | Cenci et al. | 526/36 |
| 4,138,541 | 2/1979 | Cenci et al. | 526/303 |
| 4,203,900 | 5/1980 | Kaiser | 548/239 |
| 4,209,607 | 6/1980 | Shalaby et al. | 528/291 |
| 4,293,669 | 10/1981 | Rottmaier et al. | 525/452 |
| 4,443,490 | 4/1984 | Nakajima et al. | 427/44 |
| 4,482,659 | 11/1984 | Sanjana et al. | 523/414 |
| 4,608,419 | 8/1986 | Dorman et al. | 525/329.9 |
| 4,626,575 | 12/1986 | Goel | 525/329.5 |
| 4,677,167 | 6/1987 | Goel | 525/375 |
| 4,705,885 | 11/1987 | Just et al. | 560/158 |
| 4,708,984 | 11/1987 | Forgione et al. | 525/127 |
| 4,727,111 | 2/1988 | Pettit, Jr. et al. | 525/190 |
| 4,761,457 | 8/1988 | Arita et al. | 525/439 |
| 4,785,070 | 11/1988 | Rasmussen et al. | 528/73 |
| 4,788,255 | 11/1988 | Pettit, Jr. et al. | 525/131 |
| 4,801,680 | 1/1989 | Geary et al. | 528/272 |
| 4,889,890 | 12/1989 | Kerr et al. | 525/113 |
| 4,937,288 | 6/1990 | Pettit, Jr. et al. | 525/176 |
| 4,988,767 | 1/1991 | Pettit, Jr. | 525/194 |
| 4,990,579 | 2/1991 | Paar | 525/528 |
| 5,006,622 | 4/1991 | Kunzler et al. | 526/309 |
| 5,013,791 | 5/1991 | Kerr et al. | 525/113 |
| 5,039,759 | 8/1991 | Hoy et al. | 525/437 |
| 5,098,955 | 3/1992 | Pettit, Jr. | 525/194 |
| 5,124,421 | 6/1992 | Ulbrich et al. | 526/212 |
| 5,130,479 | 7/1992 | Ulbrich et al. | 562/874 |
| 5,143,582 | 9/1992 | Arkens et al. | 162/135 |
| 5,182,337 | 1/1993 | Pettit, Jr. et al. | 525/176 |
| 5,214,101 | 5/1993 | Pettit, Jr. et al. | 525/176 |
| 5,266,628 | 11/1993 | Essary et al. | 524/336 |
| 5,292,807 | 3/1994 | Schafer et al. | 525/113 |
| 5,318,990 | 6/1994 | Strauss | 524/549 |
| 5,340,868 | 8/1994 | Strauss et al. | 524/461 |
| 5,346,947 | 9/1994 | Guerro et al. | 524/591 |
| 5,360,876 | 11/1994 | Burgoyne, Jr. et al. | 525/374 |
| 5,395,911 | 3/1995 | Frings et al. | 528/87 |
| 5,427,587 | 6/1995 | Arkens et al. | 8/116.1 |
| 5,536,766 | 7/1996 | Seyffer et al. | 524/100 |

FOREIGN PATENT DOCUMENTS

| | | |
|---|---|---|
| 0 471 409 A1 | 2/1992 | European Pat. Off. . |
| 0 583 086 A1 | 2/1994 | European Pat. Off. . |
| 0 651 088 A1 | 5/1995 | European Pat. Off. . |
| 1 466 996 | 2/1969 | Germany . |
| 5 148429 | 3/1991 | Japan . |
| WO 94/03545 | 2/1994 | WIPO . |
| WO 94/11451 | 5/1994 | WIPO . |

*Primary Examiner*—Nathan M. Nutter
*Attorney, Agent, or Firm*—John D. Thallemer

[57] ABSTRACT

Mono(hydroxyalkyl)urea and 2-oxazolidone crosslinking agents and compositions which utilize such crosslinking agents are disclosed. The mono(hydroxyalkyl)urea crosslinking agents contain a single urea group, a single hydroxyl group, and have at least two carbon atoms disposed between the urea group and the hydroxyl group. The compositions contain a poly-functional molecule which contains at least two functional groups selected from the group consisting of carboxyl and anhydride.

8 Claims, No Drawings

MONO(HYDROXYALKYL)UREA AND OXAZOLIDONE CROSSLINKING AGENTS

FIELD OF THE INVENTION

The present invention relates to mono(hydroxyalkyl)urea and 2-oxazolidone crosslinking agents and the use thereof to replace formaldehyde-based crosslinking agents.

BACKGROUND OF THE INVENTION

Synthetic polymers are used in a wide variety of applications. In many applications, these synthetic polymers are crosslinked in order to achieve the required performance properties. For over 60 years, a large class of commercially important thermoset polymers have utilized formaldehyde-based crosslinking agents. Such crosslinking agents based on formaldehyde traditionally have provided an efficient and cost-effective means of curing a wide variety of materials. Examples of formaldehyde-based crosslinking agents include melamine-formaldehyde, urea-formaldehyde, phenol-formaldehyde and acrylamide-formaldehyde adducts. With growing toxicity and environmental concerns, there has been an ongoing search to replace formaldehyde-based crosslinking agents. However, these alternative crosslinkers have suffered from significant deficiencies including low or slow cure, requiring end uses to change their commercial high speed application equipment, and emission of toxic components or volatile organic compounds other than formaldehyde.

To address this unfilled need for a robust formaldehyde-free crosslinker, we have found unexpectedly that mono(hydroxyalkyl)ureas result in facile and safe crosslinking of di- and/or poly-functionalized molecules and polymers, as described herein below.

SUMMARY OF THE INVENTION

The present invention relates to mono(hydroxyalkyl)urea and 2-oxazolidone crosslinking agents which are essentially free of formaldehyde and to compositions which utilize such crosslinking agents. The compositions comprise a polyfunctional molecule comprising at least two functional groups selected from the group consisting of carboxyl and anhydride; and a crosslinking agent selected from the group consisting of a mono(hydroxyalkyl)urea crosslinking agent comprising a single urea group, a single hydroxyl group, and at least two carbon atoms disposed between the single urea group and the single hydroxyl group, and 2-oxazolidone. The crosslinking agent is present in amounts effective to provide crosslinked compositions. The 2-oxazolidone may be either ab initio or formed in situ.

DETAILED DESCRIPTION OF THE INVENTION

The compositions according to the present invention comprise a polyfunctional molecule (PFM). As used herein, "molecule" includes nonpolymeric molecules, low molecular weight polymers or oligomers, for instance having molecular weight of less than about 10,000, and higher molecular weight polymers, for instance having molecular weight of greater than about 10,000 to greater than 1,000,000. The actual molecular weight of the molecule is not a limiting factor with respect to the use of the crosslinking agents of the present invention.

The PFM must contain at least two functional groups selected from the group consisting of carboxyl and anhydride. Exemplary molecules which may be used in the present invention include without limitation citric acid, 1,2,4-benzene tricarboxylic acid, 1,2,4,5-benzene tetracarboxylic acid, 1,2,3,4-butane tetracarboxylic acid, poly(acrylic acid), carboxylic-acid-functionalized polyesters, carboxylic-acid-functionalized polyurethanes, and polymers prepared from monomers such as ethylene (E), vinyl acetate (VA), (meth)acrylic acid (M)AA, the $C_1$–$C_8$ alkyl esters of (meth)acrylic acid, maleic anhydride (MAnh), maleic acid, itaconic acid (IA), crotonic acid (CA), β-carboxy ethyl acrylate (BCEA), butadiene and styrene (STY). (Meth)acrylic is used herein to denote both acrylic and methacrylic acids and esters thereof. Exemplary copolymers include ethylene/vinyl acetate/acrylic acid copolymers, vinyl acetate/acrylic acid copolymers, acrylic acid/maleic anhydride copolymers, vinyl acetate/acrylic acid/maleic anhydride copolymers, ethylene/acrylic acid copolymers, ethylene/methacrylic acid copolymers, ethylene/vinyl acetate/acrylic acid/maleic anhydride copolymers, vinyl acetate/maleic anhydride copolymers, ethylene/vinyl acetate/maleic anhydride copolymers, methyl methacrylate/butyl acrylate/acrylic acid copolymers, methyl methacrylate/ethyl acrylate/acrylic acid copolymers, methyl methacrylate/butyl acrylate/itaconic acid copolymers, butyl acrylate/acrylic acid copolymers, butyl acrylate/BCEA copolymers, ethyl acrylate/acrylic acid copolymers, 2-ethylhexyl acrylate/acrylic acid copolymers, methyl methacrylate/ethyl (meth)acrylate/itaconic acid copolymers, styrene/(meth)acrylic acid copolymers, styrene/maleic anhydride copolymers, styrene/(meth)acrylic acid/maleic anhydride copolymers, styrene/itaconic acid copolymers and styrene/butadiene copolymers. Additionally, polymers comprising anhydride groups may be generated in situ during preparation of poly(acrylic acid). These examples are not limiting and the mono(hydroxyalkyl)urea crosslinking agents according to the present invention may be used to crosslink virtually any molecule which comprises at least two functional groups selected from the group consisting of carboxyl, amine and anhydride. The mono(hydroxyalkyl)urea crosslinking agent is very versatile and may be used easily to crosslink aqueous solution polymers, organic solution polymers, polymer melts, emulsion polymers, aqueous and non-aqueous dispersions of polymers, and powders.

The mono(hydroxyalkyl)urea crosslinking agents of the present invention are derived from urea, comprise only a single urea group, a single hydroxyl group, and have at least two carbon atoms disposed between the urea group and the hydroxyl group. The crosslinking agent may include compounds represented by Structure (I). The two carbons disposed between the hydroxyl and urea groups may be in linear, branched or substituted configuration.

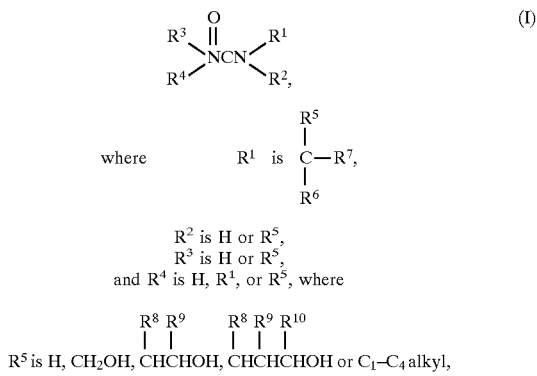

-continued

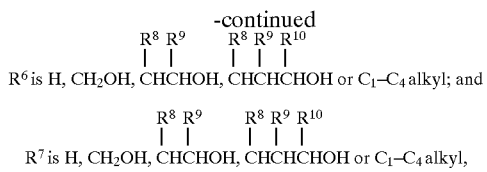

$R^6$ is H, CH$_2$OH, CHCHOH, CHCHCHOH or C$_1$–C$_4$ alkyl; and $$\begin{array}{cc} R^8\ R^9 & R^8\ R^9\ R^{10} \\ |\ \ | & |\ \ |\ \ | \end{array}$$

$R^7$ is H, CH$_2$OH, CHCHOH, CHCHCHOH or C$_1$–C$_4$ alkyl, where $R^8$ is H, methyl or ethyl, $R^9$ is H, methyl or ethyl, and $R^{10}$ is H, methyl or ethyl.

Exemplary mono(hydroxyalkyl)urea crosslinkers include, without limitation, (2-hydroxyethyl)urea, (3-hydroxypropyl)urea, (4-hydroxybutyl)urea, 1,1-dimethyl-2-hydroxyethylurea, 1-ethyl-2-hydroxyethylurea, and (2-hydroxyethyl)ethyleneurea. The terms "crosslinking agent" and "crosslinker" are used interchangeably herein.

In certain embodiments of the invention, the PFM may be generated in situ from starting molecules which do not comprise at least two functional groups selected from the group consisting of carboxyl and anhydride. When the starting molecules and the mono(hydroxyalkyl)urea crosslinkers are combined under certain conditions effective to induce crosslinking, functional groups will be generated such that the molecules comprise at least two functional groups selected from the group consisting of carboxyl and anhydride. The functional groups may be generated in situ by the addition of heat to the system or by chemical reaction with the starting molecules. For example, acid catalyzed hydrolysis of alkyl esters such as methyl or t-butyl, are very facile in generating carboxylic acid. Other mechanisms of generating functional groups in situ will be readily apparent to those skilled in the art once having the benefit of the teachings contained herein.

The PFM and the mono(hydroxyalkyl)urea crosslinking agent will be present in relative amounts such that the ratio of the sum total number of equivalents of the functional groups contained in the PFM to the number of equivalents of the hydroxyl groups contained in the crosslinker ranges from about 2:1 to about 100:1. Preferably, the ratio of the sum total number of equivalents of the functional groups contained in the PFM to the number of equivalents of the hydroxyl groups contained in the mono(hydroxyalkyl)urea crosslinker ranges from about 2:1 to about 10:1.

In certain embodiments of the present invention, Lewis acid and Lewis base catalysts may be used in combination with the crosslinking agent in order to further enhance crosslinking. Such catalysts generally include clays, silica, including without limitation colloidal silica, organic amines, quaternized-amines, metal oxides, metal sulfates, metal chlorides, urea sulfate, urea chloride and silicate-based catalysts. Exemplary catalysts which may be used in the invention are set forth in Table 3. Phosphorus-containing catalysts may be used in the present invention, including without limitation alkali metal hypophosphite salts, alkali metal phosphites, alkali metal polyphosphates, alkali metal dihydrogen phosphates, polyphosphoric acid and alkyl phosphinic acids. Such catalysts, when used, are used in less than stoichiometric amounts as the maximum level allowed, and in minimum amounts effective to improve crosslinking compared to a non-catalyzed, crosslinked composition. Each of the "catalyzed", crosslinked compositions of the invention exhibited significant increase in crosslinking when compared to a non-catalyzed, crosslinked composition of the invention, as evidence by the increase in insolubles noted in Table 3.

It is essential to note that the crosslinkable compositions according to the present invention do not require conventional crosslinking agents, such as epoxies or formaldehyde-containing crosslinking agents such as aminoplasts, nor do they require other reactive materials, for instance, isocyanate groups which would react with the hydroxyl groups, in order to provide articles of manufacture as disclosed herein. They preferably are free of such reactive materials which might interfere with the reaction of the hydroxyl groups of the mono(hydroxyalkyl)urea with the particular reactive group of the PFM. Accordingly, the crosslinkable systems of the present invention are essentially free of such epoxies, aminoplasts and isocyanate compounds, and even more preferably are free of such reactive species.

In methods of crosslinking the PFMs with the mono (hydroxyalkyl)urea crosslinkers, the crosslinker and PFM are combined under conditions effective to induce crosslinking of the PFM. Such conditions permit water to be removed from the system, thereby inducing crosslinking of the PFM. These conditions may be provided by adjusting temperature and/or pressure. For example, it is advantageous to cure the compositions at temperatures around 100° C., preferably greater than 100° C., in order to drive off water from the system. In fact, one of the advantages of the crosslinkers of the present invention is that they work particularly well in systems which must be cured at temperatures greater than 100° C. Curing may occur at pressures where water may be removed from the system, for example at low pressures or under vacuum. Both temperature and pressure be may be adjusted such that water may be removed from the system. Additionally, crosslinking may be induced by chemical reaction. For example, as noted herein above, under certain conditions PFMs may be generated in situ. Whether crosslinking be induced by heat transfer or by chemical reaction, the conditions must be effective to remove water from the system, thereby inducing crosslinking.

Compositions of the present invention may be used in preparing a number of compositions and articles of manufacture and may be applied to polymeric natural substrates, such as woven or non-woven cellulose, wood, leather, paper, cotton, wool, rayon and silk, and polymeric synthetic substrates, such as polyolefin, polyester, polyamide, polyvinyl chloride, polyvinylidene chloride and polyimide. Other substrates to which the compositions may be applied include glass, metal and composite substrates such as sand, ceramic, foundry sand and molds. The compositions may be used in preparing coatings, such as automotive coatings, powder coatings, adhesive coatings, inks and paints. The compositions also may be used as binders or sizing agents in the preparation of, for example, glass or cellulosic fibers, non-woven paper products, fiberglass insulation or batting, glass fiber rovings and molded fiberglass articles. The compositions also may be used as binders in woven and non-woven textiles and as backcoatings in carpets and other textiles. The compositions further may be used as saturants in the preparation of laminates, foams and mastics and as adhesives for the natural and synthetic substrates noted above.

Representative crosslinking agents of the present invention and methods for making same are set forth below. While one skilled in the art may be aware of other means of producing such compounds, the following examples are among the preferred methods for preparing the crosslinking agents.

Synthesis of Crosslinking Agents

EXAMPLE 1

61 g monoethanolamine and 60 g urea were charged in a 1L flask equipped with heating mantle, thermometer and stirrer and allowed to react at 115° C. for 3 hours. A nitrogen purge was used to remove evolving ammonia. The progress of reaction was monitored by amine titration. A clear, hygroscopic liquid was obtained which contained a mixture of (2-hydroxyethyl)urea and 2-oxazolidone, which could be used as a crosslinker without purification.

In like manner, additional alkanolamines could be reacted in equimolar amounts with urea to obtain mono (hydroxyalkyl)urea crosslinkers, and include without limitation 3-aminopropanol, 4-aminobutanol, 2-amino-1-butanol, and 2-amino-2-methyl-1-propanol.

EXAMPLE 2

61 g of monoethanolamine in 100 g water was neutralized with concentrated hydrochloric acid. 81 g potassium cyanate was added and the mixture heated to 90° C. for 2 hours. After cooling to ambient temperature, potassium chloride was precipitated by addition of 200 ml of ethanol. The salt was filtered out and the final product was obtained upon removal of water and ethanol by rotary evaporation. The product was a hygroscopic liquid containing (2-hydroxyethyl)urea, which could be used as a crosslinker without further purification. The product similarly could be obtained using other acids to neutralize the amine, e.g. sulfuric acid, and using other cyanates, e.g. sodium cyanate.

EXAMPLE 3

Using the method of example 1, the reaction also can be conducted effectively using refluxing water as a means of removing evolved ammonia. 61 g diethanolamine, 18 g water and 60 g urea were charged in a 1L flask equipped with heating mantle, thermometer and stirrer and allowed to react at 115° C. for 3 hours.

Procedure for Determining Extent of Crosslinking by Measuring Percent Insoluble in Water 1. Combine polymer and crosslinker in specified amounts, based on equivalent weights.
2. Cast film in petri dish and dry overnight under ambient conditions.
3. Cut approximately 1 g piece of film and weigh accurately.
4. Put film in weighed aluminum tare and cure according to specified time/temperature schedule. (E.g. 200° C., 10 minutes). Weigh film again.
5. Fill jar with water. Cap jar and store overnight under ambient conditions.
6. Filter sample through weighed stainless 200 mesh screen.
7. Dry sample and screen to constant weight. Reweigh for final weight.
8. Calculate percent insoluble=dried sample weight/cured sample weight×100%.

The following tables set forth crosslinking data for compositions of the present invention and for comparative compositions

TABLE 1

Crosslinking of Poly(Acrylic Acid) Films

| Crosslinker Description | Crosslinker Synthesis | % Water Insoluble |
|---|---|---|
| mono(2-hydroxyethyl)urea/2-oxazolidone mixture | Example 1 | 85 |
| 2-oxazolidone[1] | Aldrich | 72 |
| mono(2-hydroxyethyl)urea | Example 2 | 86 |
| (2-hydroxyethyl)-2-aminoethylurea | Example 1 | 67 |

TABLE 1-continued

Crosslinking of Poly(Acrylic Acid) Films

| | | |
|---|---|---|
| (2-hydroxyethyl)ethyleneurea[2] | Sartomer | 74 |
| None | | 0 |
| Ethylurea (control)[3] | Aldrich | 0 |

Polymer: poly(acrylic acid); 60,000 Mw
Cure: 200° C.; 10 minutes
Crosslinker level: 0.8:1 w/w crosslinker:poly(acrylic acid), on solids basis
% Insoluble: Overnight immersion in water at ambient conditions

[1]2-oxazolidone, 98% obtained from Aldrich Chemical Co.
[2](2-hydroxyethyl)ethyleneurea (SR512) obtained from Sartomer Co.
[3]ethylurea, 97% obtained from Aldrich Chemical Co.

TABLE 2

Crosslinking on Glass Substrate

| Crosslinker | % Pickup | Dry Tensiles (lb) CMD | Wet Gurley Stiffness (mgf) MD |
|---|---|---|---|
| None | 22 | 10.2 | 618 |
| mono(2-hydroxyethyl)urea/ oxazolidone mixture | 22 | 12.7 | 2497 |
| mono(2-hydroxyethyl)urea | 23 | 11.9 | 3075 |
| phenolic resin (control) | 20 | 12.2 | 2853 |

Polymer: 5,000 Mw poly(acrylic acid)
Cure: 200° C.; 10 minutes
Crosslinker level: 40 wt % crosslinker versus poly(acrylic acid)
Substrate: Whatman GF/B Glass Fiber Filter Paper
Wet Stiffness: Cured specimen soaked one minute in 1% Triton X-100 solution, then reequilibrated to ambient temperature and humidity

TABLE 3

Catalyzed Crosslinking

| Catalyst | % Water Insoluble |
|---|---|
| none | 0 |
| sodium hypophosphite | 63 |
| Tyzor ™ LA[1] | 12 |
| Ludox ™ SK[2] | 13 |

Polymer: 60,000 Mw poly(acrylic acid)
Cure: 10 minutes, 150° C.
Crosslinker Level: 0.7:1 w/w crosslinker:poly(acrylic acid) on solids basis
Crosslinker: mono(2-hydroxyethyl)urea
Catalyst Level: 0.08 mol equivalents per carboxyl

[1]Ammonium salt of lactic acid chelate of titanium available from E.I. duPont & Nemours.
[2]Colloidal silica available from E.I. duPont & Nemours.

We claim:
1. A composition, comprising:
   (1) a poly-functional molecule comprising at least two functional groups selected from the group consisting of carboxyl and anhydride; and
   (2) a crosslinking agent selected from the group consisting of a mono(hydroxyalkyl)urea comprising a single urea group, a single hydroxyl group, and at least two carbon atoms are disposed between the urea group and the hydroxyl group, and 2-oxazolidone, wherein the crosslinking agent is present in an amount effective to crosslink the poly-functional molecule.
2. The composition according to claim 1 herein the ratio of the sum total number of equivalents of functional groups contained in the poly-functional molecule to the number of equivalents of hydroxyl groups contained in the crosslinking agent ranges from about 2:1 to about 100:1.

3. The composition according to claim 2 wherein the ratio of the sum total number of equivalents of functional groups contained in the poly-functional molecule to the total number of equivalents of hydroxyl groups contained in the crosslinking agent ranges from about 2:1 to about 10:1.

4. The composition according to claim 1 wherein said mono(hydroxyalkly)urea crosslinking agent is selected from the group consisting of (2-hydroxyethyl)urea, (3-hydroxypropyl)urea, (4-hydroxybutyl)urea, 1,1-dimethyl-2-hydroxyethylurea, 1-ethyl-2-hydroxyethylurea, and (2-hydroxyethyl)-ethyleneurea.

5. The composition according to claim 1 further comprising a catalyst selected from the group consisting of a Lewis acid or Lewis base catalyst.

6. The composition according to claim 5 wherein the catalyst is selected from the group consisting of alkali metal hypophosphite salts, alkali metal phosphites, alkali metal polyphosphates, alkali metal dihydrogen phosphates, polyphosphoric acid, and alkyl phosphinic acids.

7. The composition according to claim 6 wherein the catalyst is sodium hypophosphite.

8. An article of manufacture comprising a thermoset composition which comprises
   (1) a poly-functional molecule comprising at least two functional groups selected from the group consisting of carboxyl and anhydride; and
   (2) a crosslinking agent selected from the group consisting of a mono(hydroxyalkyl)urea comprising a single urea group, a single hydroxyl group, and at least two carbon atoms are disposed between the urea group and the hydroxyl group, and 2-oxazolidone, wherein the crosslinking agent is present in an amount effective to crosslink the poly-functional molecule.

* * * * *